United States Patent [19]

Woolfolk

[11] Patent Number: 4,872,057

[45] Date of Patent: Oct. 3, 1989

[54] PULSE MODULATED AUTOMATIC LIGHT CONTROL UTILIZING GATED IMAGE INTENSIFIER

[75] Inventor: Thomas M. Woolfolk, Gordenville, Va.

[73] Assignee: Sperry Marine Inc., Charlottesville, Va.

[21] Appl. No.: 293,557

[22] Filed: Jan. 3, 1989

Related U.S. Application Data

[63] Continuation of Ser. No. 934,068, Nov. 21, 1986, abandoned.

[51] Int. Cl.⁴ .............................................. H04N 5/14
[52] U.S. Cl. ................................. 358/211; 358/213.19
[58] Field of Search ................... 358/213.19, 211, 228; 372/29, 43–50, 38

[56] References Cited

U.S. PATENT DOCUMENTS

| | | | |
|---|---|---|---|
| 3,848,085 | 11/1978 | Van Atta | 358/211 |
| 4,347,437 | 8/1982 | Mourou | 250/211 R |
| 4,431,914 | 2/1984 | Mourou et al. | 250/211 J |

Primary Examiner—Robert Lev
Attorney, Agent, or Firm—Seymour Levine

[57] ABSTRACT

Automatic light control apparatus for a television camera system utilizing a gated image intensifier wherein a pair of laser diodes illuminate, respectively, a pair of avalanche photodiodes to apply switching voltages to the image intensifier. Low-level gating signals are utilized to activate the laser diodes. The laser diodes are gated on and off in complementary fashion whereby the image intensifier is turned on for pulse intervals inversely proportional to the brightness of the scene being televised.

3 Claims, 2 Drawing Sheets

PULSE MODULATED AUTOMATIC LIGHT CONTROL UTILIZING GATED IMAGE INTENSIFIER

This invention was made with United States Government support and the United States Government has certain rights therein.

This is a continuation of co-pending application Ser. No. 934,068 filed on Nov. 21, 1986, now abandoned.

BACKGROUND OF THE INVENTION

1. Field of the Invention

The invention pertains to image intensified television camera systems particularly with respect to pulse modulating the image intensifier tube to effect automatic light control.

2. Description of the Prior Art

Television camera systems are known in the art that include automatic light control. In such automatic light control systems the average light intensity level impinging on the face plate of the television camera is maintained at a substantially constant level irrespective of scene illumination. Such prior art automatic light control systems generally utilize a motor driven iris to compensate for changes in total scene illumination. Alternatively a variable neutral-density filter prior to the lens is rotated to control the level of scene brightness entering the camera. Such devices are mechanical in nature and require continuous adjustment during normal operation. Friction and wear limit the performance characteristics and life of such systems. Additionally, motor and brush noise may cause undesirable interference in the system. Additionally since the prior art systems function by changing the total incoming light level, a moving scene may produce smear during the frame time of the camera.

Low light level television camera systems are known in the art that utilize a light amplification or image intensification device between the lens and the camera. Such image intensification devices may be utilized to maintain a reasonably constant level of brightness on the television display despite varying levels of brightness from the scene. A problem arises when endeavoring to utilize such low light level television systems over a wide dynamic range of light input. Present day image intensifiers are sensitive to damage caused by light input overload. Excessive light causes high current conduction in the device resulting in overheating which causes device damage. Additionally although a number of present day image intensifiers are gateable, the networks required for gating the image intensifier utilizing microsecond pulses are large and require excessive power rendering such devices unusable in a gated mode in practical applications. A high voltage delay-line pulse generator is an example of such an undesirable gating device.

SUMMARY OF THE INVENTION

The above disadvantages of the prior art are overcome in a television camera system that utilizes an image intensifier by providing means for gating the image intensifier on and off utilizing a gating duty cycle duration in accordance with the scene illumination so as to control the light level impinging on the television camera. Preferably photosensitive solid state switching means are utilized to gate switching voltages to the image intensifier. Logic level control signals are applied to light emitting means to illuminate the photosensitive solid state switching means so as to gate the image intensifier in accordance with the logic level control signals. Preferably avalanche photodiodes are utilized as the photosensitive solid state switching means and laser diodes are utilized as the light emitting means. A pair of switches each comprising an avalanche photodiode illuminated by a laser diode operating in complimentary on-off fashion control a voltage divider to provide the appropriate gating signals to the image intensifier.

DESCRIPTION OF THE PREFERRED EMBODIMENT

The present invention is embodied in a system similar to that described in U.S. Pat. No. 4,202,014 issued May 6, 1980 entitled "Pulse Modulated Automatic Light Control" and assigned to the assignee of the present invention. Said U.S. Pat. No. 4,202,014 is incorporated herein by reference.

Figure 1:
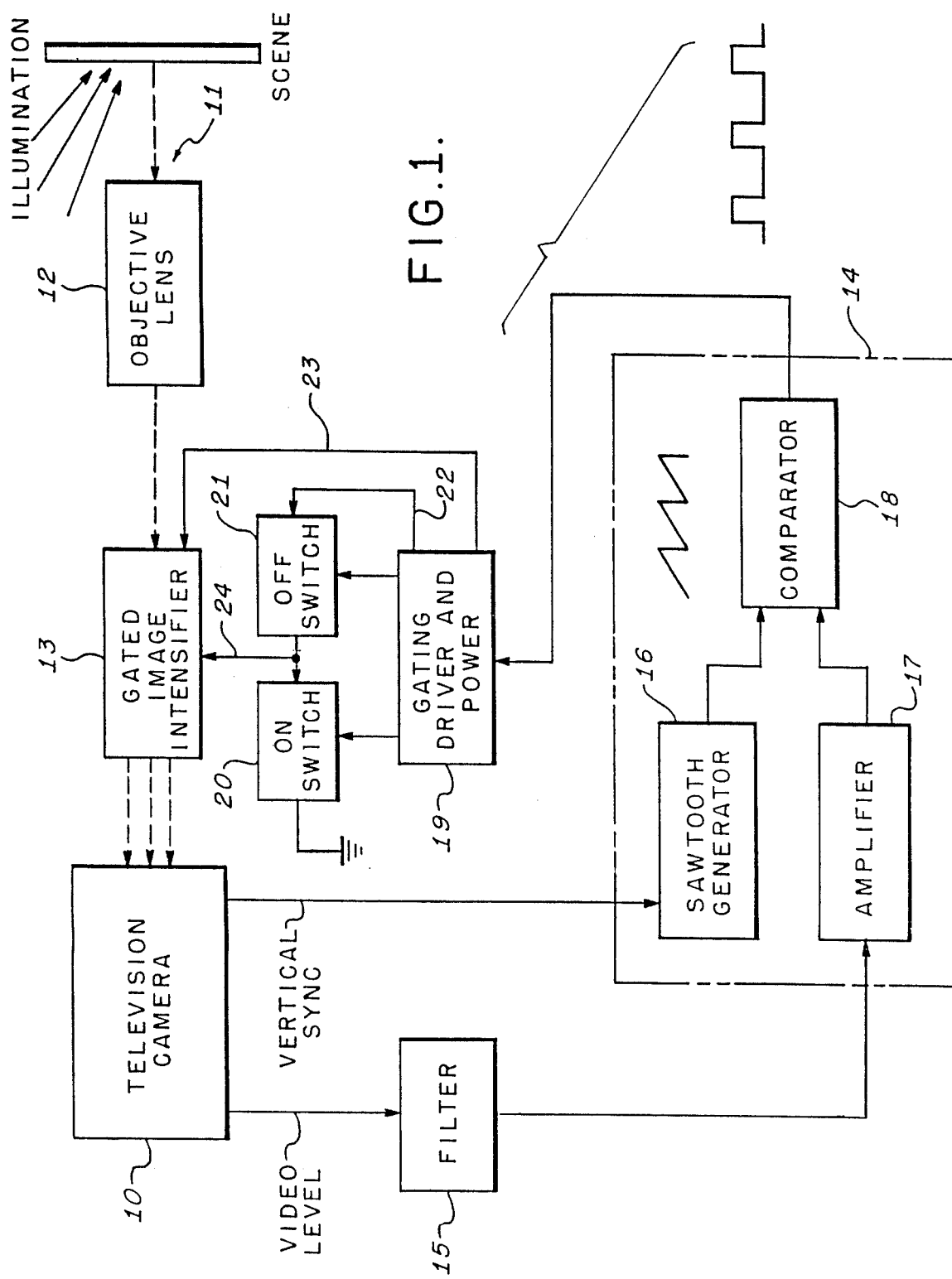
FIG. 1 is a schematic block diagram illustrating a television camera system utilizing the invention.

Referring to FIG. 1, conventional television camera 10 receives light from an illuminated scene along an imaging path 11. The light is transmitted through an objective lens 12 and a gated image intensifier 13 so as to impinge upon the face plate of the television camera 10. The objective lens 12 is a conventional device. Typically the television camera 10 includes a camera tube having a face plate on which is formed a matrix of photosensitive elements. Light from the scene being televised is transmitted along the imaging path 11 to activate the individual photosensitive elements in the matrix in accordance with the intensity of light reflected from the individual elements in the scene. An electron beam repetitively scans the matrix and produces a video signal corresponding to the charge accumulated on the individual photosensitive elements. Typically the television camera 10 is adjusted so that the matrix is scanned 30 times per second and each scan is initiated by a vertical synchronizing signal.

It is appreciated that the type of television camera utilized is not germane to the invention. For example, a solid-state camera that employs a charge-coupled device (CCD) sensor may be utilized to the same effect as is well known such a camera does not scan with an electron beam.

The gateable image intensifier 13 is preferably of the solid state variety, for example a proximity-focused Gen-II tube. Such tubes are gated off when the photocathode input thereof is at a more positive voltage than the microchannel plate input thereof. The tube is gated on when the photocathode input thereof is at a more negative voltage than the microchannel plate input thereof. The tube may, for example, be gated off or on, respectively, by switching the photocathode voltage either 50 volts positive or 250 volts negative with respect to the microchannel plate input voltage. Such gateable image intensifier tubes area commercially available as, for example, part number F4112 from the Electro-Optical Products Division of ITT, Fort Wayne, Ind. or as part No. 510-9323-301 from Varo Incorporated, Garland, Tex.

As illustrated in FIG. 1 the circuit for gating the image intensifier 13 on and off includes a pulse width modulator 14 which is coupled to receive the vertical synchronizing signal from the television camera 10 and the video level signal therefrom through a low-pass filter 15.

As is known to those skilled in the art, television cameras include means for producing a vertical synchronizing pulse to initiate each scanning cycle. Similarly, television cameras also contain means for producing a video level signal representative of the white-level content of the portion of the scene being scanned at any given time. In the circuit of the invention, the video level signal is applied through the low-pass filter 15 which averages the white-level content of the scene and thus converts the picture information into an analog signal representing the total light in the scene. The resulting d.c. signal from the filter 15 is applied to the pulse width modulator 14. The pulse width modulator 14 is triggered by the vertical synchronizing signal so as to initiate an output pulse in response to that signal. The modulator is further constructed to maintain the output pulse for a time dependent upon the d.c. level of the signal from the filter 15.

Typically, as depicted in FIG. 1, the pulse width modulator 14 contains a function generator 16 arranged to produce a sawtooth wave form synchronized to the television vertical frame rate and an amplifier 17 to receive the analog voltage representative of the video level from the filter 15 so as to provide a d.c. voltage of suitable level to a voltage comparator 18 which also receives the sawtooth wave from the function generator 16. The amplifier 17 includes an inversion circuit whereby the d.c. output from the amplifier 17 is inversely related to the d.c. level input thereto.

The vertical synchronizing pulses from the television camera 10 initiate each triangular pulse in the sawtooth wave generator 16. The voltage from the filter 15, which is proportional to scene brightness, is processed in the amplifier 17 to adjust the gain and absolute d.c. voltage level thereof to provide an amplifier output voltage that decreases with scene brightness. The sawtooth wave and the amplifier output voltage are compared in the comparator 18. When the vertical synchronizing signal initiates a sawtooth pulse, the comparator 18 is in its high output state. When the sawtooth wave attains the level of the amplifier output voltage, the comparator 18 switches to its low output state. Thus, the relative length of time that the comparator 18 remains in the high output state is proportional to the ratio of analog voltage to sawtooth voltage amplitude and hence is inversely proportional to scene brightness.

Effectively, the pulse width modulator 14 produces a train of output pulses having a pulse repetition rate synchronzed with the vertical scanning rate of the television camera 10 and a duty cycle representative of the average light intensity of the scene being televised.

The train of output pulses from the pulse width modulator 14 are low voltage level logic signals, for example TTL level signals, and are applied to gating driver and power circuitry 19. The circuitry 19 includes a conventional gating circuit for providing low-level gating signals, to be described, to an on-switch module 20 and to an off-switch module 21. The gating signals provided by the circuitry 19 to the on-and off-switch modules 20 and 21 are generated in accordance with the pulse train output from the pulse width modulator 14. The circuitry 19 also includes a power supply for providing appropriate voltages to the switch module 21 as well as to the gated image intesifier 13. For example, the power supply within the circuitry 19 provides +250 volts to the off-switch module 21 via a line 22 and +200 volts to the microchannel plate input terminal of the gated image intensifier 13 via a line 23. The power supply also provides further voltages to the gated image intensifier 13 in a manner to be later described.

The switch modules 20 and 21 apply a gating signal via a line 24 to the photocathode terminal (gating terminal) of the gated image intensifier tube 13. The gating signals provided by the circuitry 19 to the on-and off-switch modules 20 and 21 are appropriate low-level signals for complementary switching thereof. When the on-switch module 20 is activated by the gating driver 19, the switch module 20 shorts the photocathode terminal of the image intensifier tube 13 to ground, thereby turning the image intensifier tube 13 on. When the off-switch module 21 is activated by the gating driver 19, the module 21 switches +250 volts to the photocathode terminal thereby gating the tube 13 off.

Specifically, the switch modules 20 and 21 are selectively operated by the gating driver 19 to apply either a turn-on or a turn-off voltage to the gating input of the image intensifier tube 13. To gate the tube 13 off, the photocathode terminal is held at a more positive voltage than the microchannel plate input terminal by closing the off-switch 21 and simultaneously opening the on-switch 20. To gate the tube 13 on, the switch actuation is reversed thereby applying a more negative voltage to the photcathode terminal than to the microchannel plate input terminal. In the preferred embodiment of the invention, the switch modules 20 and 21 comprise photo-optically controlled switches preferably implemented by avalanche photodiodes which are operated by applying light pulses thereto.

Figure 2:
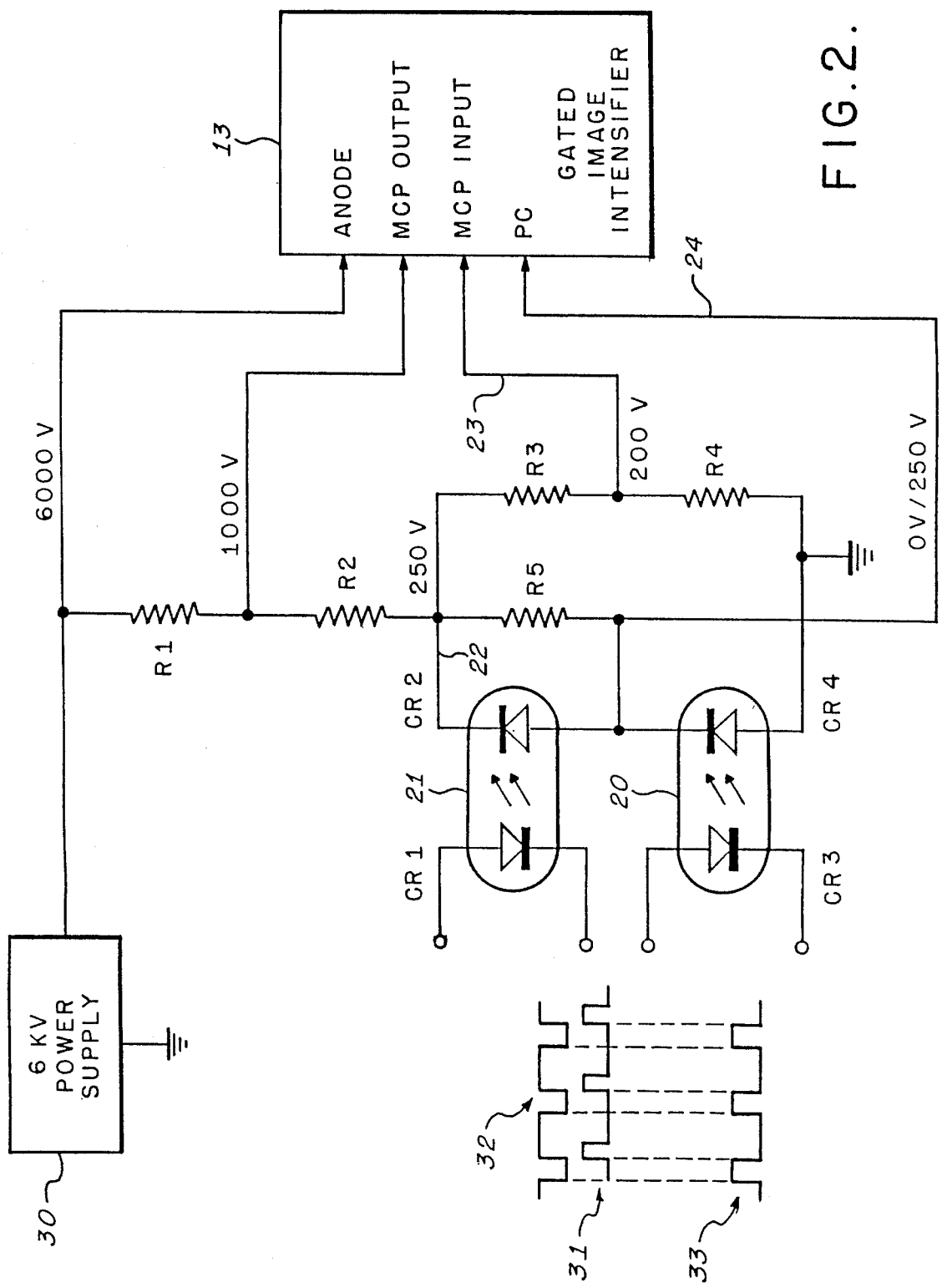
FIG. 2 is a schematic wiring diagram illustrating details of the preferred embodiment of the invention.

Referring to FIG. 2, in which like reference numerals indicate like components with respect to FIG. 1, details of the components 13 and 19-24 of FIG. 1 are illustrated. A 6 KV power supply 30 provides the power for the various input terminals of the gated image intensifier tube 13. The anode of the tube 13 utilizes the full supply voltage of the power supply 30. Resistors R1-R4 between the power supply 30 and ground form a voltage divider to provide the appropriate voltages for the microchannel plate (MCP) output terminal and the MCP input terminal. As illustrated in FIG. 2, the MCP output terminal receives 1000 volts and the MCP input terminal receives 200 volts via the line 23 as discussed above with respect to FIG. 1. The photocathode (PC) terminal receives, via the line 24, a voltage that is switched between zero volts and 250 volts. As previously discussed the application of zero volts to the PC terminal turns the tube 13 on and the application of 250 volts to the PC terminal turns the tube 13 off.

The on-switch 20 and the off-switch 21 are comprised of two complementary photo-optical switches consisting preferably of diode pairs CR1-CR2 and CR3-CR4 as illustrated. In the preferred embodiment of the invention CR2 and CR4 are avalanche photodiodes and CR1 and CR3 are laser diodes. For reasons to be discussed in more detail, CR1 is a pulsed laser diode. The avalanche photodiodes CR2 and CR4 may, for example, be obtained from RCA as part Number C30817. The pulsed laser diode CR1 may be procured as part Number SDL-2100-E1 from Spectra Diode Laboratories, Incorporated, San Jose, Calif. and the laser diode CR 3 may be obtained as part Number LT-015MD from Sharp Electronics Incorporated, Paramus, N.J.

Preferably the switch 21 is configured and operated in a pulsed mode. When embodied for pulsed mode operation, the wave form 31 is applied to the switch 21. When operated in a complementary continuous fashion the wave form 32 is applied to the switch 21. In both modes of operation the wave form 33 is applied to the switch 20. In the complementary continuous mode of operation the laser diodes CR1 and CR3 are controlled by the gating wave forms 32 and 33 such that when one of the diodes is on the other is off. When a laser diode (CR1 or CR3 is emitting light the avalanche photodiode (CR2 or CR4) paired therewith conducts thereby effectively closing the switch. When the switch 21 is active and the switch 20 is inactive the photocathode (PC) is pulled to 250 volts. This renders the photocathode (PC) 50 volts more positive than the microchannel plate (MCP) input and the image intensifier 13 is gated off. When however the switch 20 is active and the switch 21 inactive, the PC is pulled to ground thus turning the tube 13 on.

When operated in the pulsed mode the image intensifier tube 13 is turned on for the duration of the gating pulses 33 applied to the laser diode CR3. Upon termination of a gating pulse 33 the switch 20 effectively opens and the switch 21 is activated for a brief interval to pull the photocathode (PC) to the turnoff voltage of 250 volts. This is effected by the gating pulses 31. When a gating pulse 31 terminates, the switch 21 effectively opens and a resistor R5 maintains PC at 250 volts thereby maintaining the image intensifier tube 13 in its off state until the next occurring turn on gating pulse 33.

When configured for complementary continuous operation, whenever the switch 20 is gated on the switch 21 is gated off. Conversely whenever the switch 21 is gated on the switch 20 is gated off. Thus the PC switching voltage on the line 24 is continuously provided by the complementary switching action of the switches 20 and 21. In this mode of operation the resistor R5 is not required.

The gating signals 31, 32 and 33 are generated in a conventional manner in the gating driver circuitry 19 of FIG. 1 which in turn is operated by the pulse width modulator 14 of FIG. 1 of the automatic light control circuitry as described above.

Referring to FIGS. 1 and 2 the operation of the system of the invention will now be described. Operation commences when a vertical synchronizing signal in the television camera 10 initiates a scanning cycle. The same signal triggers the pulse width modulator 14 and initiates an output pulse which, via the gating driver 19, activates the on-switch 20 and deactivates the off-switch 21. The gated image intensifier 13 is thus turned on. As the scanning progresses, the camera 10 produces a video level signal which passes through the filter 15 so as to provide a signal representing the average white-level content of the scene. The resulting signal from the filter 15 is applied to the pulse width modulator 14 wherein it functions to reset the modulator and thus terminate the output pulse from the modulator as a function of the total light being received. As discussed above the modulator 14 is adjusted so that under conditions of relatively high light intensity, the level of the signal from the filter 15 is such that the modulator 14 is reset quickly so as to produce a relatively short output pulse. Termination of the output pulse from the modulator 14 results in deactivating the on-switch 20 and activating the off-switch 21 thereby turning off the gated image intensifier 13. Therefore under conditions of relatively high light intensity, the image intensifier 13 is on for a small fraction of the scanning cycle. For progessively lower light levels, the signal from the filter 15 permits the modulator 14 to remain in its triggered state for progressively longer periods of time and thus to retain the image intensifier 13 in its on state for greater portions of the scanning cycle. In general, the width of the pulses produced by the modulator 14, and therefore the time during which the image intensifier 13 is held on, is an inverse function of the intensity of the light reaching the television camera 10.

Although under most conditions the image intensifier 13 is maintained on for less than a complete scanning cycle, under conditions of extremely low light intensity, the image intensifier 13 may remain in the energized state for a period of time exceeding a single scan cycle. Under these conditions, the signal is merely integrated and stored until the information from the next scanning cycle is read out.

It will be appreciated that although FIG. 1 illustrates the image intensifier 13 interposed between the television camera 10 and the objective lens 12, the image intensifier may be placed between the objective lens 12 and the scene, if desired. From the foregoing it is appreciated that whereas the prior art devices operate by reducing the light intensity reaching the camera so as to integrate the received information for a definite amount of time but to a reduced level, the circuit of the present invention integrates received information to the full level but for shortened periods of time. The system of the invention permits the television camera 10 to use faster shutter speeds for higher light levels and thus image smear is minimized.

It will be appreciated that although the switches 20 and 21 are described in terms of the laser diodes CR1 and CR3, any suitable light emitting source may be utilized such as a light emitting diode (LED). By utilizing a laser diode illuminating an avalanche photodiode as an optical switching device, a means for switching a solid-state image intensifier tube off and on in a rapid manner for use in television cameras requiring automatic light control or fast shuttering is achieved. Avalanche photodiodes are light operated devices which when illuminated with a pulse of light, such as from a laser diode, are capable of switching from extremely high impedence levels to conduction in less than one nanosecond. Thus the necessary speed for the application is achieved. Dark mode leakage currents are negligible and avalanche photodiodes with breakdown voltage ratings above 400 volts are available. A significant aspect of the device is the optical isolation effected by each of the switches 20 and 21 which permits levels of 300 volts to be switched while operating the laser diodes with low voltage (TTL-level) circuitry to drive the avalanche photodiodes.

By modulating the on-time of the image intensifier tube 13 in inverse proportion to the brightness level of the viewed scene, a uniform level of brightness is maintained on the television screen regardless of variations in scene illumination. The brighter the scene, the shorter the amount of time the intensifier is required to be gated on. By utilizing a laser diode to activate an avalanche photodiode, the required gating voltage can be switched to the image intensifier in a fraction of a microsecond and the laser can be driven by low-level sources. The entire gate driver is very small and utilizes a low level of power. The automatic light control control system responds rapidly and accommodates a large dynamic range in light input. The invention is capable of handling a $10^7$ brightness level range which is the equivalent of a night sky with quarter moonlight to full daylight. With the present invention the image intensifier tube is capable of responding to activation pulses as short as 5 nanoseconds. The invention is simple to construct and has a low parts count and low real estate utilization on a printed circuit board on which the invention is constructed.

Because of the pulse width modulation technique utilized in the present invention the maximum light input to the gated image intensifier 13 is increased approximately 1,000 times compared to conventional utilization of the tube before tube damage becomes a significant problem. Thus the present invention increases the light overload that the image intensifier can withstand by approximately 1,000 times.

In summary, the present invention provides the following advantages: small size, solid-state implementation, no moving parts, no motor driven devices with associated brush noise, response speed of one microsecond compared to milliseconds for motorized iris configurations, low power consumption, the ability to drive from low voltage signals and a wide dynamic range of light input.

Although the above described embodiment of the invention was explained in terms of a variable duration pulse with pulse width inversely proportional to the seam brightness, it would be appreicated that automatic light control, in accordance with the invention, may also be achieved utilizing pulse frequency modulation. In this embodiment the video level generated by the television camera 10 is transmitted through the low pass filter 15 to obtain the dc level equivalent to the average scene brightness. This brightness signal is amplified in the amplifier 17. Instead, however, of utilizing a saw tooth generator 16 and a comparator 18 the signal from the amplifier 17 is applied to a voltage-to-frequency convertor (VFC). The VFC generates a train of fixed duration pulses, with the frequency of occurrence dependent upon the level signal from the amplifier 17. During the occurrence of each pulse the intensifier 13 is gated on so that instead of one variable with pulse per frame several fixed duration pulses are instead utilized. With respect to automatic light control considerations the effect of the variable frequency pulse train is the same as the single variable width pulse and the prescepts of the present invention are equally applicable thereto. For example, the VFC under conditions of high scene brightness and consequent high video level a train of relatively narrow width pulses at a low pulse repetition rate is generated. For low scene brightness and a consequent low video level the same width pulses are generated but at a higher repetition rate. The output of the VFC is applied to the gating driver 19 for appropriate conversion to pulse frequency modulated signals of the type illustrated in FIG. 2 at 32, 33.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Light control apparatus for a television camera comprising:
    image intensifier means for amplifying light from a scene incident to said camera;
    means for providing a brightness signal in accordance with brightness levels of said light from said scene;
    pulse modulator means responsive to said brightness signal for generating pulses having durations in accordance with said brightness signal;
    gating means responsive to said pulses for providing first and second gating pulses, said first gating pulses having pulse durations in accordance with said durations of said pulses, said second gating pulses provided at expirations of said durations of said first gating pulses; and
    control means responsive to said first and second gating pulses for providing on and off voltages to respectively turn said image intensifier means on and off.

2. The light control apparatus of claim 1 wherein said control means includes;
    means for providing supply voltages; and
    switch means responsive to said first gating pulses for coupling said on voltages from said supply means to said image intensifier means for time intervals equal to said pulse durations of said first gating pulses and responsive to second gating pulses for coupling said off voltages from said supply means to said image intensifier means, said off voltages remaining applied to said image intensifier means until a pulse of said first gating pulses is coupled to said switch means.

3. The light control apparatus of claim 1 wherein said first and second gating pulses are complementary, said second gating pulses being at a low level when said first gating pulses are at a high level and said second gating pulses being at a high level when said first gating pulse are at a low level, and wherein said control means includes:
    means for providing supply voltages; and
    switch means constructed and arranged for providing voltages from said supply means to said image intensifier means that turn-on said image intensifier means when said first and second gating pulses are at a first permutation of high and low levels and for providing voltages to said image intensifier means that turn-off said image intensifier means when said first and second gating pulses are at a second permutation of high and low levels.

* * * * *